(No Model.)

H. C. SERGEANT.
CHUCK FOR ROCK DRILLS.

No. 297,456. Patented Apr. 22, 1884.

Witnesses:—
Fred Haynes
Harry Bogert

Inventor:
Henry C. Sergeant
by his attorneys
Brown & Hall

UNITED STATES PATENT OFFICE.

HENRY C. SERGEANT, OF DENVER, COLORADO.

CHUCK FOR ROCK-DRILLS.

SPECIFICATION forming part of Letters Patent No. 297,456, dated April 22, 1884.

Application filed February 23, 1884. (No model.)

*To all whom it may concern:*

Be it known that I, HENRY C. SERGEANT, a citizen of the United States, residing at Denver, in the county of Arapahoe and State of Colorado, have invented a new and useful Improvement in Chucks for Rock-Drills, of which the following is a specification, reference being had to the accompanying drawings.

This invention consists in a novel combination of parts in a chuck for rock-drills, whereby the drill or drill-rod will be clamped and held at diametrically-opposite points and concentric with the rod of the drill-operating piston.

Figure 1:
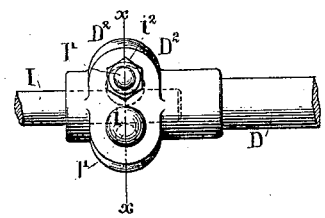
Figure 2:
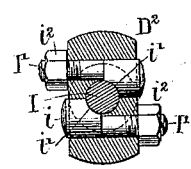
Figure 3:
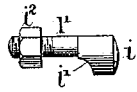

Figure 1 in the drawings is a side view of a chuck constructed according to my invention and of parts of the drill or drill-rod and of the piston-rod. Fig. 2 is a transverse section of the chuck and drill or drill-rod in the line $x\ x$ of Fig. 1; and Fig. 3 is a longitudinal view of one of the clamping-bolts of the chuck.

Similar letters of reference indicate corresponding parts in the several figures.

$D^2$ is the chuck, which may be formed integral with the piston-rod or carrying-rod D, and which consists of a socket bored concentrically to the rod D, for the reception of the drill or drill-rod I, which is fitted into its bore and clamped therein by means of two clamping screw-bolts, I' I'. These bolts are both alike, each having the inner face of its head made concave, as shown at $i'$, to fit that portion of the drill or drill-rod I which is within the bore of the chuck; and they are inserted through the chuck from opposite sides thereof and on opposite sides of the drill or drill-rod, as shown best in Fig. 2, so that the concave faces $i'$ of their heads fit to diametrically-opposite portions of the drill or drill-rod. The bolts being thus inserted and having their nuts on opposite sides, the screwing up of their nuts causes their said concave faces to press in opposite directions upon the drill or drill-rod, and so not only to center the drill or rod in the chuck, and so hold it in line with the piston-rod, but also to bring the wear very largely on the two bolts, which are renewable at small expense, and to reduce to a minimum the wear on the inside of the chuck, which would be much more expensive to renew. The clamping of the drill or rod is thus accomplished very securely and almost entirely by the bolts themselves, and almost independently of the interior of the chuck, and without the necessity of additional clamping pieces or boxes in the chuck. The said bolts only require to have their heads project on that side which is toward the drill or drill-rod. This projection is obtained in the example shown by making the heads round but eccentric to the stems of the bolts themselves. This eccentricity also prevents the bolts from turning in the chuck.

What I claim as my invention, and desire to secure by Letters Patent, is—

The combination, with the drill-chuck having a socket for the reception of the drill or drill-rod, of clamping screw-bolts having their heads formed with concave bearing-surfaces $i'\ i'$, and inserted through the chuck from opposite sides thereof and on opposite sides of its socket, for clamping the drill or drill-rod by pressure applied in opposite directions on diametrically-opposite portions thereof, substantially as herein described.

HENRY C. SERGEANT.

Witnesses:
FRED HAYNES,
HARRY BOGERT.